(12) United States Patent
Ramsauer

(10) Patent No.: US 11,506,239 B2
(45) Date of Patent: Nov. 22, 2022

(54) CAGE NUT

(71) Applicant: Dieter Ramsauer, Schwelm (DE)

(72) Inventor: Dieter Ramsauer, Schwelm (DE)

(*) Notice: Subject to any disclaimer, the term of this patent is extended or adjusted under 35 U.S.C. 154(b) by 112 days.

(21) Appl. No.: 15/750,322

(22) PCT Filed: Oct. 15, 2015

(86) PCT No.: PCT/EP2015/002042
§ 371 (c)(1),
(2) Date: Feb. 5, 2018

(87) PCT Pub. No.: WO2017/020921
PCT Pub. Date: Feb. 9, 2017

(65) Prior Publication Data
US 2018/0216653 A1    Aug. 2, 2018

(30) Foreign Application Priority Data
Aug. 6, 2015 (DE) .......................... 202015005604.0

(51) Int. Cl.
F16B 37/04    (2006.01)
(52) U.S. Cl.
CPC .................................. *F16B 37/044* (2013.01)
(58) Field of Classification Search
CPC .......................................... F16B 37/044
USPC .................................. 411/112, 970
See application file for complete search history.

(56) References Cited

U.S. PATENT DOCUMENTS

| | | | | |
|---|---|---|---|---|
| 3,398,496 A | * | 8/1968 | Mischke | F16B 5/0275 52/463 |
| 3,785,421 A | * | 1/1974 | Launay | F16B 21/02 411/108 |
| 3,877,342 A | * | 4/1975 | Duchatellier | F16B 12/14 411/50 |
| 4,303,361 A | * | 12/1981 | Moryl | F16B 37/042 411/108 |
| 4,531,870 A | * | 7/1985 | Moryl | F16B 37/042 411/108 |
| 4,923,347 A | * | 5/1990 | Moryl | F16B 37/044 411/182 |

(Continued)

FOREIGN PATENT DOCUMENTS

| | | |
|---|---|---|
| DE | 695 03 312 | 2/1999 |
| DE | 198 60 434 | 7/2000 |

(Continued)

OTHER PUBLICATIONS

International Search Report PCT/EP2015/002042 dated Apr. 18, 2016.

(Continued)

*Primary Examiner* — Flemming Saether
(74) *Attorney, Agent, or Firm* — Haug Partners LLP

(57) ABSTRACT

A cage nut including a nut arranged in a cage. The cage has a base which has a round hole from which two opposing side parts ascend, each side part carrying a supporting portion facing outward. The cage and the nut have diametrically opposed projections which are shaped in such a way that, in a determined rotational position, when the nut is arranged in the cage it can be partially inserted axially into a non-round, preferably square opening in a thin wall, if necessary after compressing the side parts, whereupon the screw can be screwed into the nut.

7 Claims, 5 Drawing Sheets

(56) References Cited

U.S. PATENT DOCUMENTS

| | | | | |
|---|---|---|---|---|
| 8,348,569 B2* | 1/2013 | Tournier | ............... | F16B 37/044 |
| | | | | 411/108 |
| 2008/0145175 A1 | 6/2008 | Tournier | | |
| 2008/0253859 A1* | 10/2008 | Johnson | ............... | F16B 37/044 |
| | | | | 411/103 |

FOREIGN PATENT DOCUMENTS

| | | |
|---|---|---|
| DE | 102 10 709 | 10/2003 |
| EP | 0 681 110 | 11/1995 |
| EP | 1 846 664 | 1/2010 |
| FR | 2 495 244 | * 12/1980 |

OTHER PUBLICATIONS

Office Action for Application No. 2018/27003888 issued by the Indian Patent Office dated Nov. 27, 2019.
Chinese Office Action for Application No. 201580082221.0 dated Dec. 3, 2019.
Notification of The Third Chinese Office Action for Application No. 201580082221.0 dated Aug. 4, 2020.
Notification of The Fourth Chinese Office Action for Application No. 201580082221.0 dated Mar. 1, 2021.
Decision of Rejection for Chinese Application No. 201580082221.0 dated Jul. 16, 2021.

* cited by examiner

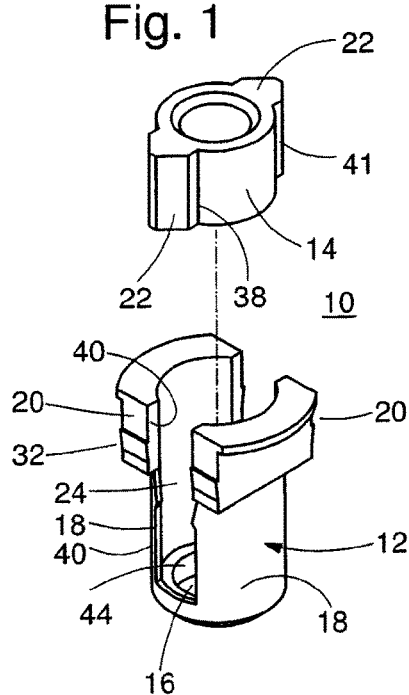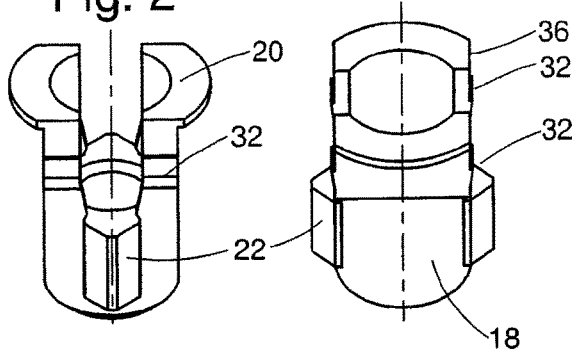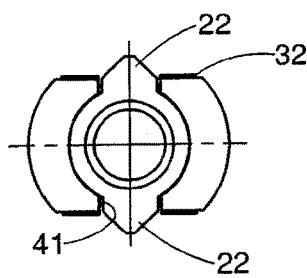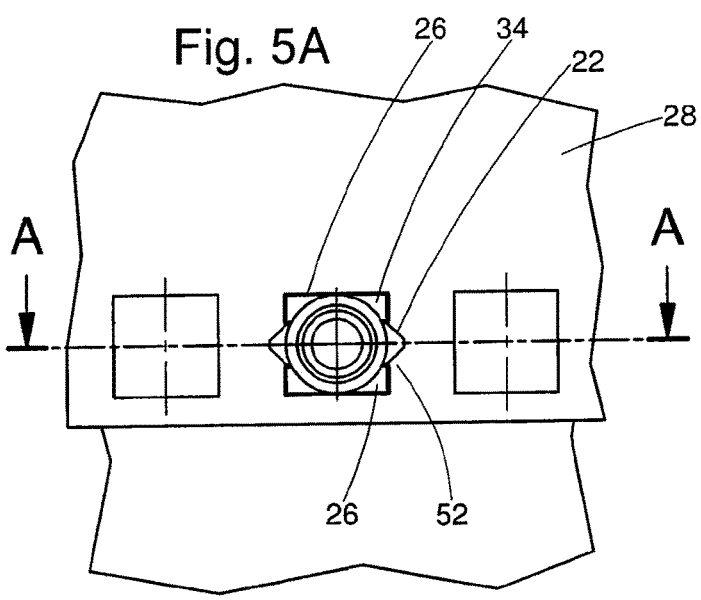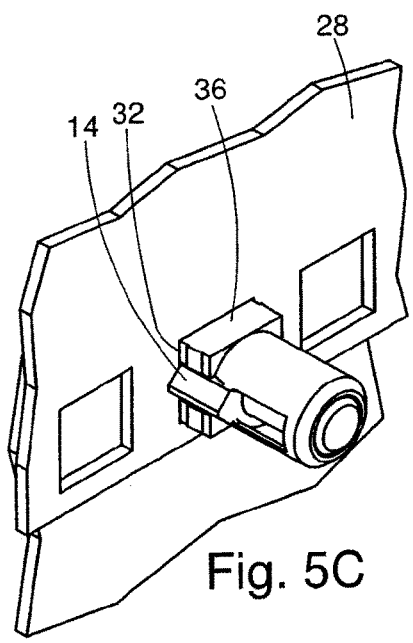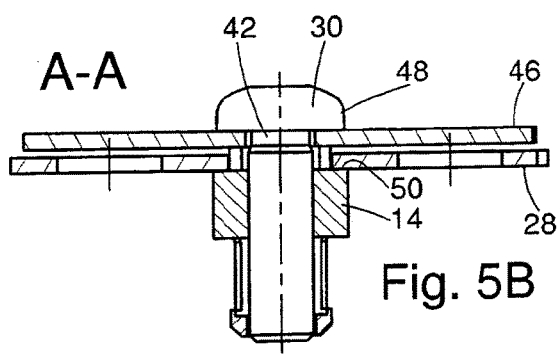

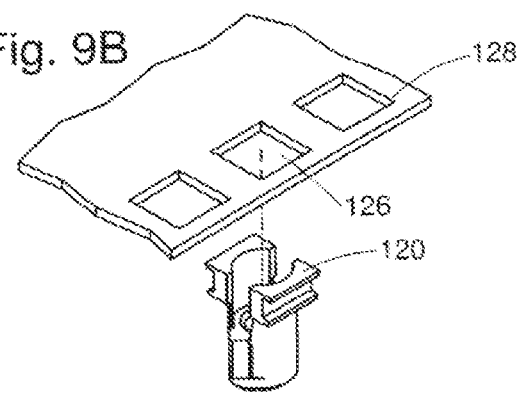
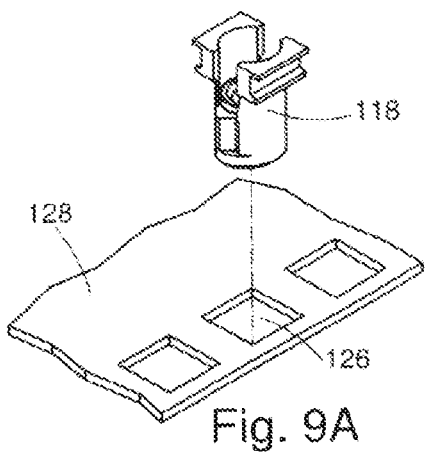
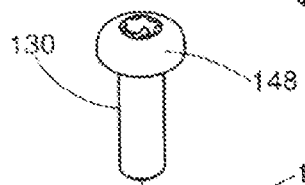
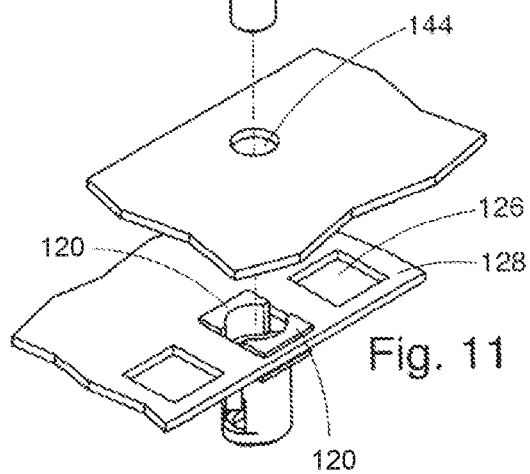
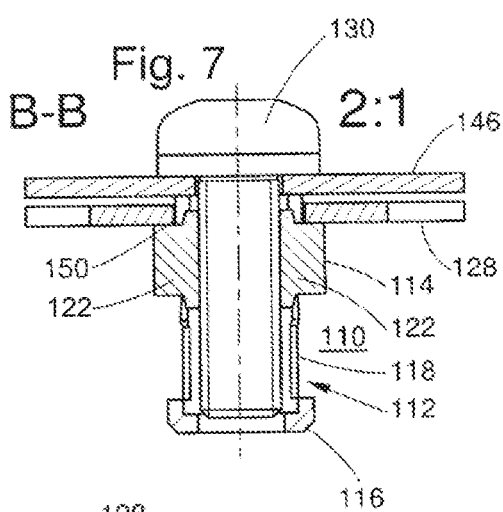
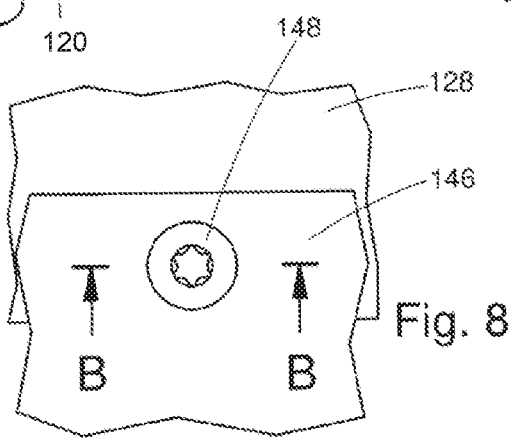

-- Prior Art --

-- Prior Art --

-- Prior Art --

CAGE NUT

The present application claims priority from PCT Patent Application No. PCT/EP2015/002042 filed on Oct. 15, 2015, which claims priority from German Priority Application No. 20 2015 005 604.0 filed on Aug. 6, 2015, the disclosures of which are incorporated herein by reference in their entirety.

FIELD OF THE INVENTION

The invention is directed to a cage nut comprising a nut arranged in a cage, the cage has a base, and two side parts which are located opposite one another ascend from the base, each side part carrying a supporting portion facing outward.

A cage nut of this type is already known from DE 198 60 434 C2.

The cage nut which is known to the Applicant and is shown in the figures (FIGS. 13A to 13C) is also mentioned.

It is disadvantageous that there is still play in the direction of the axis of the cage nut between the cage and the frame with the nut even when the nut is tightened. It is further disadvantageous that the cage nut can only be inserted from the rear and only with a tool.

SUMMARY OF THE INVENTION

The object of the invention is to provide further embodiment forms of the cage nut in accordance with a related type which has further advantages such as expanded mounting and which avoids the above-mentioned drawbacks at the same time.

This object is met in that the nut which is inserted into the cage can be partially pushed into the non-round, preferably rectangular, particularly square, opening in a thin wall in a rotational position, if necessary after compressing the side parts, whereupon the cage with the nut is turned within the opening possibly, according to an alternative, by an angle of less than 90 degrees, preferably 45 degrees, whereupon the cage with the nut can be pushed in farther until the supporting portions contact the thin wall, whereupon the screw can be screwed into the nut.

The characterizing feature allows a cage nut to be inserted into openings in a thin wall, preferably rectangular openings in this case, such as a perforated rack, in that it can be initially partially inserted, whereupon the cage with the nut is turned in the opening by an angle of less than 90 degrees, preferably 45 degrees, whereupon the cage with the nut can be pushed in until the supporting portions contact the thin wall, whereupon the screw can be screwed into the nut.

According to a further development of the invention, the nut viewed from the top has the shape of a circle from which protrude diametrically opposed projections which narrow into a right angle, and the dimensions are such that the circle fits into the square opening and the projections fit into two opposite corners of the square.

According to another embodiment form, the cage has in the area of the diametrically opposed projections a rectangular shape which can be snugly inserted through the square opening.

According to another further development, an axially extending edge with a contact surface is provided in the area of the diametrically opposed projections, which contact surface engages with an edge formed by the nut at the transition from the circle to the projection when the screw is screwed into the nut.

According to yet another further development of the invention, the projections of the nut form a grip-behind which supports the inner rim of the square opening possibly after turning 45 degrees.

The supporting portions are formed by two strips extending at an axial distance from one another.

The one strip is supported at a missing portion of the other strip.

The invention will be described more fully with reference to embodiment examples which are shown in the drawings.

BRIEF DESCRIPTION OF THE DRAWINGS

FIG. 1 shows a perspective, exploded view of two components, namely, the cage and the nut of a cage nut according to the invention.

FIG. 2 shows a perspective view of the parts of the cage nut which are inserted one inside the other.

FIG. 3 shows a top view of the arrangement from FIG. 2.

FIG. 4 shows a view similar to FIG. 2 but rotated by 90 degrees.

FIG. 5A shows a top view of the cage nut mounted in a square hole.

FIG. 5B shows a sectional view along line A-A in FIG. 5A.

FIG. 5C shows a perspective rear view of the arrangement in FIGS. 5A and 5B.

FIG. 7 shows an enlarged view of another embodiment form of the cage nut according to the invention in axial sectional view.

FIG. 8 shows a top view of the arrangement of FIG. 7 in highly enlarged scale showing the section line from FIG. 7.

FIG. 9A shows a perspective view of the fastening process when mounting from the top.

FIG. 9B shows a corresponding view of the mounting process when mounting from the bottom.

FIG. 10 shows the arrangement after mounting has been completed.

FIG. 11 shows the arrangement from FIG. 7 but in an exploded view.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 6A:
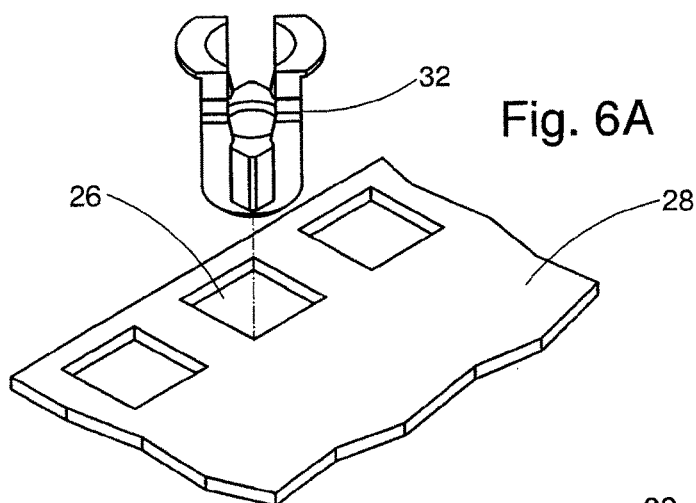
FIG. 6A shows a top view showing the mounting step of inserting the cage nut into an opening of suitable dimensions in a thin wall in a 45-degree position.
Figure 6B:
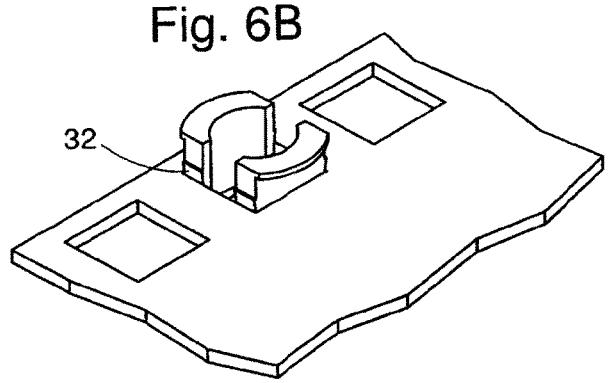
FIG. 6B shows a top view showing the subsequent mounting step of turning by 45 degrees.

FIG. 1 shows a perspective view of a cage nut 10 comprising a nut 14 arranged in a cage 12. The cage 12 has a base 16 with a bore 44 from which two opposing side parts 18 ascend, each carrying a supporting portion 20 which faces outward. The nut 14 has diametrically opposed projections 22 which are shaped in such a way that in a determined rotational position, see FIG. 6A, when the nut 14 is arranged in the cage 12 it can be partially inserted into the non-round, preferably square opening 26 in a thin wall 28, see FIG. 6B, whereupon the cage 12 with the nut 14 is rotated by an angle of less than 90 degrees, preferably 45 degrees, in the opening 26, namely, into the position shown in FIG. 6B, whereupon the cage with the nut can be pushed in until the supporting portions 20 contact the thin wall 28, whereupon the screw 30 can be screwed into the nut 14.

The sides of the supporting portions 20 carry teeth 32 which prevent the cage 12 from falling out after mounting.

Viewed from the top, see FIG. 5A, the nut 14 has the shape of a circle 34 from which protrude diametrically opposed projections 22 which narrow into a right angle. The dimensions are configured such that the circle 34 fits into the square opening 26 and the projections 22 fit into two opposite corners of the square.

The cage in the area of the diametrically opposed projections 22 has a rectangular shape 36 which can be inserted snugly through the square opening 26.

As will be seen from FIG. 5A, the nut 12 viewed from the top has the shape of a circle 34 from which protrude diametrically opposed projections 22 which narrow into a right angle. The dimensions are configured such that the circle fits into the square opening and the projections 22 fit into two opposite corners of the square. An axially extending edge 40 being provided with a contact face 41 in the area of the cage 12, the cage 12 engages, see FIGS. 1 and 3, with an edge 38 formed by the nut at the transition from the circle to the projection 22 when the screw is screwed into the nut.

The projections 22 of the nut 14 form a grip-behind 50 for the inner rim 52 of the square opening 26 after rotating 45 degrees, FIG. 5A.

Figure 6C:
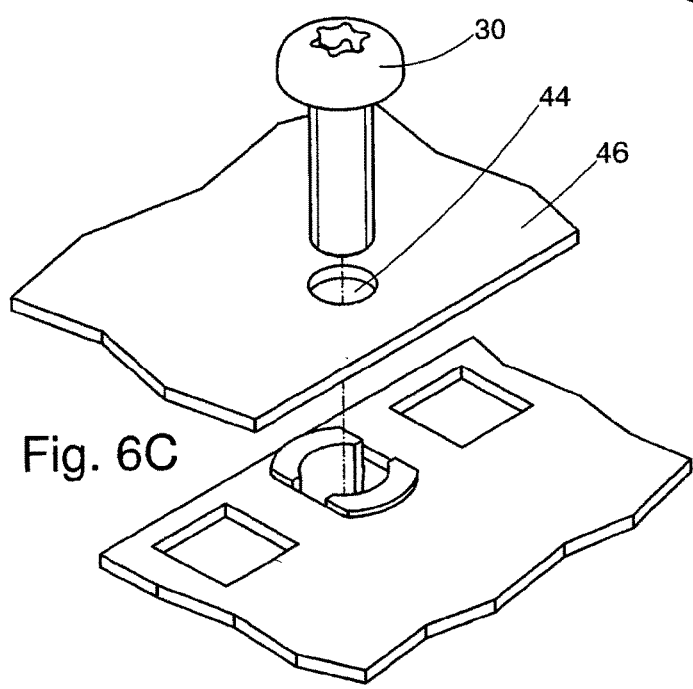
FIG. 6C shows a top view showing the mounting step of inserting a screw into a round hole in a first portion of thin wall material.
Figure 6D:
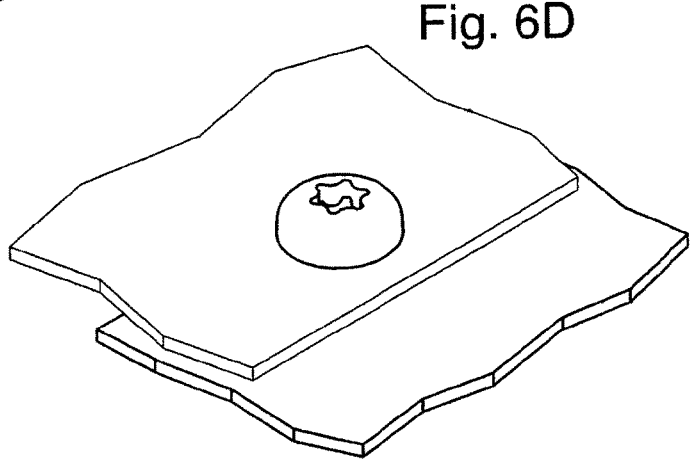
FIG. 6D shows a top view showing the mounted screw with a second part mounted on the first part.

The associated head screw 30 has a head 48 and a neck 42, and the neck 42 penetrates the round aperture 44 in the mounting plate 46, FIG. 6C.

Also located below this region are the surfaces 40, 41 of cage 12 and nut 14, which surfaces 40, 41 engage one another.

FIG. 7 shows in an axial sectional view an alternative cage nut 110 comprising a nut 114 arranged in a cage 112. The cage 112 has a base 116 with a bore 44 from which two opposing side parts 118 ascend, each carrying a supporting portion 120 which faces outward. The nut 114 has diametrically opposed projections 122, see FIG. 7, which are shaped in such a way that in a determined rotational position, see FIGS. 9A, 9B, when the nut 114 is arranged in the cage 112 it can be partially inserted into the rectangular, preferably square opening 126 in a thin wall 128, see FIGS. 10, 11, whereupon the cage 112 together with the nut 114 is snapped into the opening 126, namely, into the position shown in FIG. 10, at the lower end of the cage 112 with the upper end while compressing the side parts 118 of the cage 112 above the nut 114, whereupon the nut in the cage can be pushed in until contacting the thin wall 128 in that the screw 130 is screwed into the nut 114. The sides of the supporting portions 20 carry strips 132, 133, 135 which prevent the cage 112 from falling out after being snapped in.

Here also, see FIG. 5A, the nut 114 has the shape of a circle from which protrude diametrically opposed projections 122 which narrow into a right angle. The dimensions are configured such that the circle fits into the square opening 126 and the projections 122 fit into two opposite corners of the square.

The cage in the area of the diametrically opposed projections 122 has a rectangular shape which can be inserted snugly through the square opening 136.

Figures 12B, 12C:
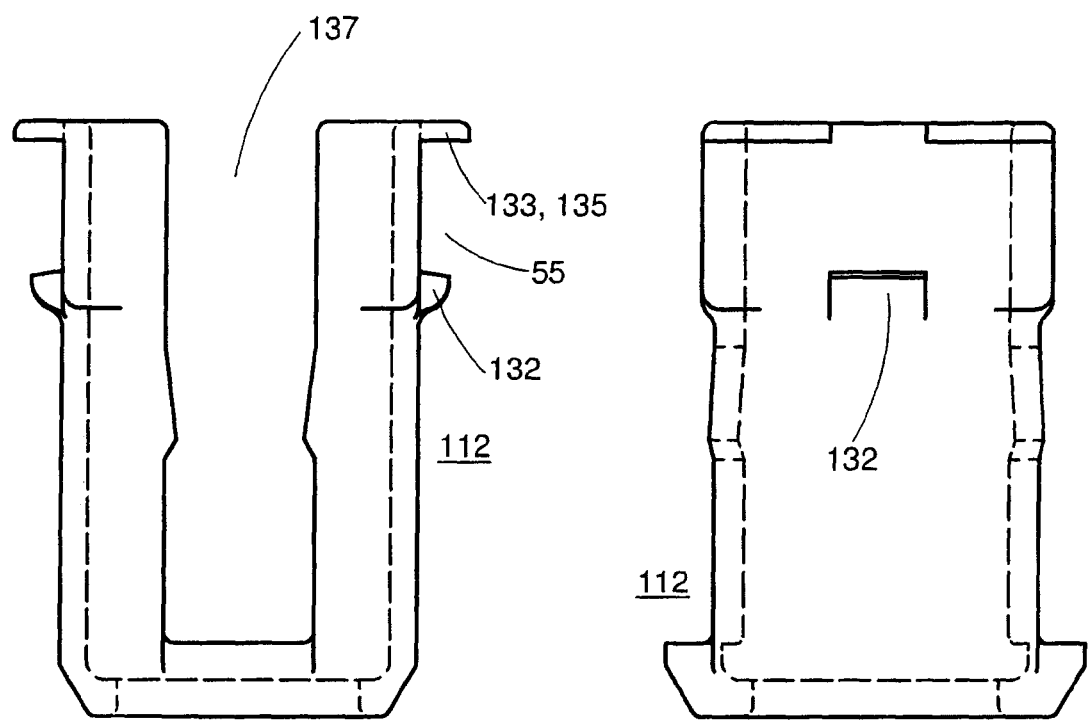
FIG. 12B shows a side view of a prior-art arrangement which is to be improved.
FIG. 12C shows a side view of the prior-art arrangement rotated by 90 degrees.
Figure 12A:
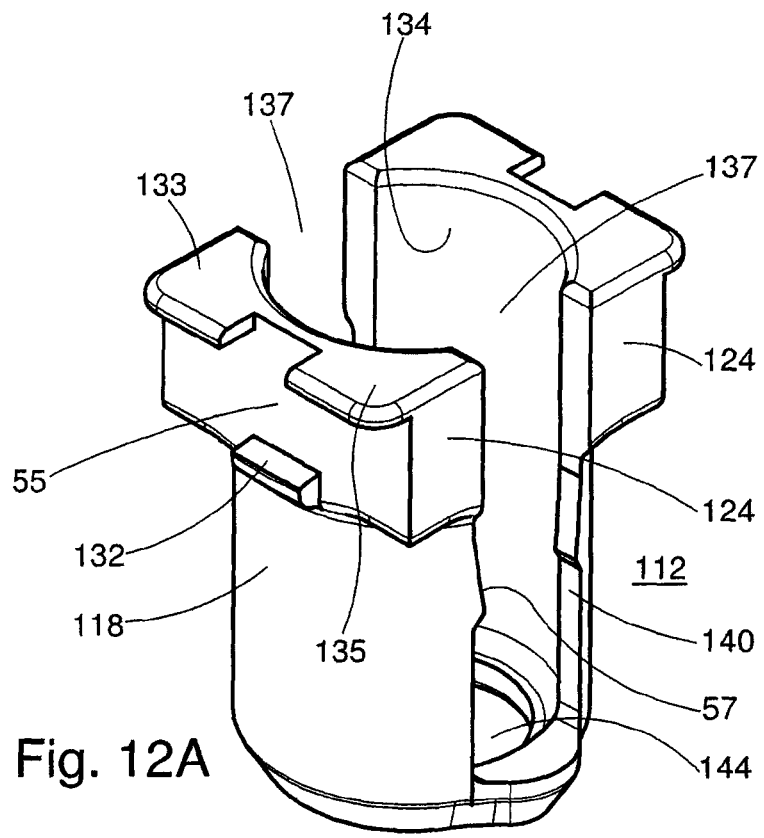
FIG. 12A shows an enlarged view of the cage of the arrangement from FIG. 7 in a perspective view.
Figure 13B:
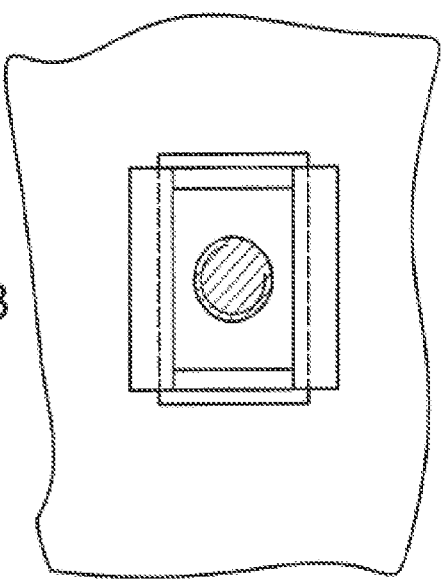
FIGS. 13A, 13B, 13C show, in section, a top view and a bottom view of the prior-art arrangement.
Figure 13A:
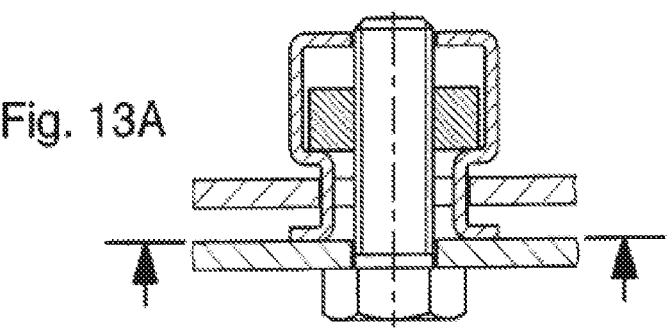
Figure 13C:
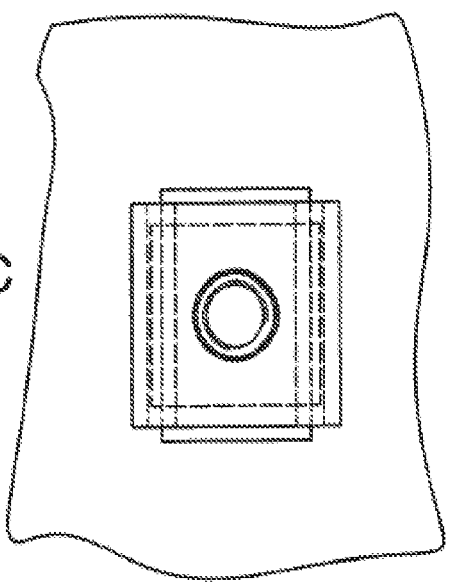

As will be seen from FIG. 12A, the cage 112 has a bore for the nut 114, which bore seen from the top has the shape of a circle 134 from which protrude diametrically opposed slots 137 for the projections 122. The dimensions are configured such that the circle fits into the square opening and the projections 122 fit into two opposite corners of the square. An axially extending edge 140 with a contact surface is provided in the area of the cage 112. The contact surface engages with an edge 138 formed by the nut at the transition from the circle to the projection 122 when the screw is screwed into the nut.

The projections 122 of the nut 114 form a grip-behind 150 which supports the inner rim of the square opening 126.

The associated head screw 130 has a head and a neck and a shank. The neck penetrates the round aperture 144 in the mounting plate.

The engaging surfaces of cage and screw are also located in this region. In its upper position, see FIG. 7, the screw of the cage prevents the side parts from being pressed together.

Accordingly, the cage 12, 112 comprises a round, cylindrical part with a twofold split and supporting portions 20, 120 which could also be called a head. Located below the head is a square projection 24, 124.

As regards the first arrangement of the cage nut 10, the latter should only be mounted blind from the front, and an acceptable fit was achieved in that the square projection 36, 136 is outfitted at four surfaces with teeth 32 which prevent the cage nut from falling out or shifting after mounting.

In the second arrangement of the cage nut 110, there is also provided a head with a square 124 located below it and an additional strip 132, 133, 135 which form a U-shaped groove 55 by which the cage 112 is anchored in the square or rectangular opening 126. In order to carry this out, the opposing side parts 118 must be bent inward somewhat during mounting so that the U-shaped grooves 55 can surround the plate 128.

It is the case with both cage nuts 10, 110 that, after mounting the cage 12, 112, the screwed-in screw 30, 130 moves the nuts 14, 114 axially until they rest on the back side of the plate 28, 128 by their projections 22, 122. During this process, the side parts 18, 118 are stabilized. The side parts and nuts then fill the square hole 26, 126 in one direction without clearance and simultaneously prevent the nuts from rotating.

The supporting portions 20, 120 can be supported by two strips 132, 133, 134 which are axially spaced apart from one another, the one strip 132 being provided in a missing portion of the other strip 133, 134 for purposes of simplifying the injection molding die.

The side parts 118 can form slits 137 which have a narrowed portion 57.

COMMERCIAL APPLICABILITY

The invention is commercially applicable in switch cabinet construction, automobile construction and in the thin sheet-metal processing industry.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

LIST OF REFERENCE NUMERALS 10, 110 cage nut
12, 112 cage
14, 114 nut
16, 116 base
18, 118 side part
20, 120 supporting portion
22, 122 projection of the nut
24, 124 projection of the cage
26, 126 square opening
28, 128 thin wall
30, 130 screw
32, 132 tooth strips, teeth
34, 134 circle
36, 136 rectangular shape
137 slits
38, 138 axial strip of the nut
40, 140 axial strip of the cage
41 contact surface of the nut
42, 142 neck
44, 144 round hole
46, 146 mounting plate
48, 148 head
50, 150 grip-behind
55 U-shaped groove
57 narrowed portion

The invention claimed is:

1. A cage nut for insertion into a thin wall, comprising:
a cage;
a nut configured to be arranged in the cage and to accept a screw therethrough, the nut having diametrically opposed projections;
wherein the cage has a base that has a round hole from which two opposing side parts ascend, each side part carrying a supporting portion facing outward, wherein the supporting portions of the two opposing side parts are distinct from one another and form a head of the cage;
wherein the supporting portions of the two opposing side parts face outward on two opposing sides of the cage and the head includes continuous flat sides on two other sides of the cage;
wherein the projections of the nut are shaped so that, in a determined rotational position, when the nut is arranged in the cage the cage nut can be partially inserted axially from a top direction into a rectangular opening in the thin wall, whereupon the screw can be screwed into the nut; and
wherein the head of the cage is shaped such that the cage with the nut arranged therein can be partially inserted from a bottom direction through the rectangular opening in the thin wall by compressing the two opposing side parts towards each other such that the rectangular projection is compressed for partial insertion through the bottom direction.

2. The cage nut according to claim 1;
wherein the cage nut is configured so that, before the screw is screwed into the nut, the cage with the nut can be turned in the rectangular opening by an angle of less than 90 degrees, wherein the cage with the nut is inserted in a diagonal direction of the rectangular opening, whereupon the cage with the nut can be pushed in until the supporting portions contact the thin wall.

3. The cage nut according to claim 1;
wherein sides of the supporting portions have teeth that are configured to prevent the cage from falling out of the rectangular opening after being mounted.

4. The cage nut according to claim 1;
wherein the rectangular opening is a square opening;
wherein the nut viewed from the top has a shape of a circle from which each nut projections protrudes and narrows into a right angle; and
wherein nut is shaped such that the circle is configured to fit into the square opening and the projections are configured to fit into two opposite corners of the square opening.

5. The cage nut according to claim 1;
wherein an axially extending edge with a contact surface is provided in the area, which contact surface is configured to engage with an edge formed by the nut at a transition from a circle to one of the nut projection when the screw is screwed into the nut.

6. The cage nut according to claim 1;
wherein the nut projections form a grip-behind configured to support an inner rim of the rectangular opening.

7. The cage nut according to claim 1;
wherein the side parts form slits, each slit having a narrowed portion along its extension.

* * * * *